Patented Oct. 30, 1951

2,572,931

UNITED STATES PATENT OFFICE 2,572,931

CELLULAR PRODUCTS COMPRISING ACRYLONITRILE POLYMERS

Robert H. Helle, Media, Pa., assignor to American Viscose Corporation, Wilmington, Del., a corporation of Delaware No Drawing. Application November 1, 1947, Serial No. 783,631

1 Claim. (Cl. 260—2.5)

This invention relates to copolymers of acrylonitrile and isobutylene in a new and novel physical form, and to methods for their production.

In accordance with this invention, copolymers of acrylonitrile and isobutylene containing from about 75 to 85% by weight of acrylonitrile in the polymer molecule are obtained in the form of resilient, permanently inflated, discrete globules characterized by a cellular cross-section, a crenulated surface, and extremely low density. These novel inflated and cellular globules comprising the acrylonitrile-isobutylene copolymers having an acrylonitrile content in the range stated are obtained by rapidly heating particles comprising the copolymers and at least some adsorbed residual mixed monomeric acrylonitrile and isobutylene to a temperature above the boiling point of the residual mixed monomers, to thereby effect abrupt volatilization of the monomers. Abrupt volatilization of the mixed monomers from the copolymer particles effects expansion or inflation of the particles, which expansion is permanent or substantially permanent.

The acrylonitrile-isobutylene copolymer particles comprising adsorbed residual monomers, are obtained by copolymerizing a mixture of the monomers consisting of from about 70 to 85% of acrylonitrile and 20 to 30% of isobutylene in accordance with the so-called granular or "pearl" polymerization process, to obtain a copolymer containing from about 75 to 85% by weight of acrylonitrile, and preferably in a yield of from 20 to 80%.

In accordance with the invention, the mixed monomers, in liquid condition, are introduced, together with a catalyst of polymerization which is soluble in the monomer mixture, and a suitable dispersing agent, into water contained in a vessel provided with means for agitating the mass, and with heating means for at least initiating the polymerization, and the mass is continuously agitated, to insure break-up of the mixed monomers into droplets in the water. The reaction is allowed to proceed until, under the prevailing conditions, the copolymer is produced in a yield in the preferred range of from 20 to 80%. The copolymer particles, which are in somewhat soft condition due to adsorbed monomers, are recovered from the reaction mixture by filtration, and are then rapidly brought to a temperature above the boiling point of the residual mixed monomeric acrylonitrile and isobutylene, to thereby abruptly volatilize the residual monomers and inflate the particles. The copolymer particles may be heated in any suitable manner. However, it is critical to the production of the inflated cellular globules with which this invention is concerned to raise the temperature of the particles comprising the residual adsorbed mixed monomers to the boiling point of the monomers very rapidly, since the novel inflated condition of the final products is directly due to the abrupt volatilization of the residual monomers. Gradual increase in the temperature of the copolymer particles comprising the residual monomers does not result in inflated or expanded globular products even when, eventually, the temperature is raised to or above the boiling point of the mixed monomers. The copolymer particles comprising the residual adsorbed mixed monomers may be rapidly heated to the boiling point of the mixed monomers, to effect abrupt volatilization of the mixed monomers and concomitant inflation of the particles, by placing the particles on the surface of an endless band traveling through a heating zone, or the particles may be dropped into or otherwise subjected to the heating action of a non-solvent liquid maintained at a temperature above the boiling point of the residual monomers, and generally at about 100° C. Preferably, the residual monomeric mixtures is abruptly volatilized, with expansion or inflation of the copolymer particles, by dropping the particles into boiling water, the period of exposure of the particles to the hot liquid being, most desirably, of comparatively short duration.

The amount of residual mixed monomers adsorbed to the copolymer particles depends upon the yield, which in turn depends upon the specific conditions under which the suspension copolymerization is effected, including the type and amount of suspending agent employed, the prevailing temperature, and the duration of the reaction. It is not possible to state the exact amount of mixed monomers absorbed to the copolymer particles, on a percentage basis. However, I have found that when the monomers are subjected to copolymerizing conditions, in suspension, until a copolymer containing from 75 to 85% of acrylonitrile in the molecule is obtained, in particulate form, in a yield of from 20 to 80%, the amount of residual mixed monomers adsorbed to the particles is such that abrupt volatilization of the residual mixed monomers effects expansion of the particles to at least twice their normal size. Yields of 20 to 80%, therefore, are preferred. It is sufficient to state the composition of the starting mixture and of the final copolymer, as well as the yield, since all of the conditions of suspension copolymerization which result in particulate copolymers in the desired ranges of composition and yield from starting monomer mixtures of from 70 to 80% acrylonitrile and 30 to 20% isobutylene can be readily and reproducibly established experimentally.

The following examples in which the parts are by weight will illustrate specific embodiments of the invention.

Example 1

200 parts of water, 1 part of magnesium carbonate and 0.5 part of benzoyl peroxide were placed in a reaction vessel provided with means for agitating the contents of the vessel and with suitable heating means. 40 parts of acrylonitrile were added, the vessel was flushed with nitrogen to remove atmospheric oxygen and 10 parts of isobutylene cooled to the liquid state were introduced. The vessel was then immediately closed. Polymerization was conducted at 50° C. for 24½ hours, during which time the contents of the vessel were continuously agitated. At the end of that time, the agitation was terminated, the vessel was cooled and opened, and the copolymer particles were recovered by filtration. The copolymer particles had an average diameter of approximately ⅛". The copolymer, which was obtained in a yield of 50%, contained 82% by weight acrylonitrile in the molecule. The copolymer particles which were in a somewhat soft condition due to the presence of residual mixed monomers were dropped, a few at a time, into a bath of boiling water. Immediate and sudden inflation or "popping" of the particles occurred, the particles being expanded to about ½" diameter. Upon removing the expanded polymer particles from the bath and drying them, the permanently inflated particles were found to be cellular in cross-section and to resemble puffed wheat or popcorn in appearance. The inflated particles or globules were resilient and had a bulk density of about 25 grams per liter.

Example 2

In a manner similar to that of Example 1, 200 parts of water, 2 parts of magnesium carbonate and 1 part of benzoyl peroxide were used as the suspension polymerization medium for the polymerization of 40 parts of acrylonitrile and 10 parts of isobutylene, the mass being agitated for 25 hours at 50° C. The copolymer was recovered in the form of discrete pearls having an average diameter of approximately $\frac{1}{32}$". The copolymer was obtained in a yield of 68%, containing 79% of acrylonitrile in the molecule. The pearls were dropped into boiling water and immediately and permanently inflated to a diameter of about ⅛". The pearls did not undergo dimensional change upon drying.

Example 3

35 parts of acrylonitrile and 15 parts of isobutylene were copolymerized under the conditions of Example 2, the polymerization time being 21 hours. The copolymer, in the form of discrete particles, was obtained in a yield of 20%. It contained 76% by weight of acrylonitrile in the molecule. The particles were immediately inflated when dropped into boiling water.

Example 4

40 parts of acrylonitrile and 10 parts isobutylene were copolymerized under the conditions of Example 2 for 72 hours. At the end of that time the agitation was terminated, and after cooling the contents of the vessel, the discrete particles were recovered. The copolymer was obtained in a yield of 78%, and contained 81% acrylonitrile by weight in the molecule. The particles were dropped into boiling water upon which they expanded abruptly.

As is apparent, the present invention produces copolymers containing a high proportion of acrylonitrile in the molecule, in a new form. The novel inflated globules exhibit properties such as insolubility in water and common solvents, toughness, and the like, resembling the properties of polyacrylonitrile, and for this reason are adapted to many special uses. Thus, the inflated crenulated globules or spheres may be exposed to most fluid media encountered in general use over a long period without deterioration. The inflated globular or spherical copolymers may be used as sound and heat insulating material, and as packing and filling material generally. Because of their low specific gravity, as low as 0.025, the copolymeric globules may be utilized in the construction of articles adapted to float on water, such as life belts, rafts, etc., and their insolubility in water renders them particularly suitable for such uses because they can be used directly as such and do not require special coating or other protective treatments. The copolymeric globules may be used for any purpose requiring products having the properties of low density and insolubility in water or common solvents, combined with flexibility or resiliency.

Since some changes and variations may be made in practicing the invention without departing from the spirit and scope thereof, it will be understood that the invention is not to be limited to the specific embodiments thereof illustrated herein, except as defined in the appended claim.

I claim:

The method of producing copolymers of acrylonitrile and isobutylene in the form of discrete, inflated globules characterized by a cellular cross-section, a crenulated surface, and low density, which comprises heating discrete particles of an acrylonitrile-isobutylene copolymer containing from 75% to 85% acrylonitrile and from 15 to 25% of isobutylene and obtained by suspending a mixture of from 70 to 80% of acrylonitrile and from 20 to 30% of isobutylene in dispersed phase, in a medium which is not a solvent for the monomer mixture or copolymer, which medium contains a polymerization catalyst which is soluble in the monomer mixture, and heating the suspension with continuous agitation to obtain the copolymer in a yield of from 20 to 80%, at a temperature above the boiling point of the mixed monomers absorbed to the copolymeric particles to thereby abruptly volatilize the residual monomers and inflate the particles.

ROBERT H. HELLE.

REFERENCES CITED

The following references are of record in the file of this patent:

UNITED STATES PATENTS

| Number | Name | Date |
| --- | --- | --- |
| 2,064,487 | Miller | Dec. 15, 1936 |
| 2,160,903 | Reilly et al. | June 6, 1939 |
| 2,275,164 | Thomas et al. | Mar. 3, 1942 |
| 2,462,354 | Brubaker et al. | Feb. 22, 1949 |

FOREIGN PATENTS

| Number | Country | Date |
| --- | --- | --- |
| 540,169 | Great Britain | Oct. 8, 1941 |
| 573,086 | Great Britain | Nov. 6, 1945 |

OTHER REFERENCES

Sachs, "Cellular Plastics in Aircraft," article in Modern Plastics, December 1945, pages 173–176.

Certificate of Correction

Patent No. 2,572,931 October 30, 1951

ROBERT H. HELLE

It is hereby certified that error appears in the printed specification of the above numbered patent requiring correction as follows:

Column 1, line 16, for "copolymers" read *copolymer*; line 28, for "70 to 85%" read *70 to 80%*; line 34, before "20" insert *about*; column 3, line 18, for "approximately 1/8". The" read *approximately 1/8". The*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*